United States Patent [19]

Weldy

[11] 4,353,567
[45] Oct. 12, 1982

[54] STEERING AND SUSPENSION SYSTEM FOR THE FRONT WHEEL OF A THREE-WHEELED VEHICLE

[76] Inventor: Ross A. Weldy, 61497 Rte. #1, C.R. 3 South, Elkhart, Ind. 46514

[21] Appl. No.: 209,523

[22] Filed: Nov. 24, 1980

[51] Int. Cl.³ .............................................. B62D 1/02
[52] U.S. Cl. .................................... 280/92; 180/211; 280/270
[58] Field of Search ................ 280/92, 270, 274, 275; 180/210, 211, 215, 216

[56] References Cited

U.S. PATENT DOCUMENTS

| | | | |
|---|---|---|---|
| 1,623,726 | 4/1927 | Herds | 280/92 |
| 1,668,368 | 5/1928 | Herds | 280/92 |
| 3,521,904 | 7/1970 | Sheffer | 280/270 |

Primary Examiner—Joseph F. Peters, Jr.
Assistant Examiner—John A. Carroll
Attorney, Agent, or Firm—Oltsch, Knoblock & Hall

[57] ABSTRACT

A steering and suspension system for the front wheel of a three-wheeled vehicle in which a pair of suspension frames pivotally support the front wheel and are in turn pivotally supported for variable movement upon rotation of the vehicle's steering wheel.

7 Claims, 8 Drawing Figures

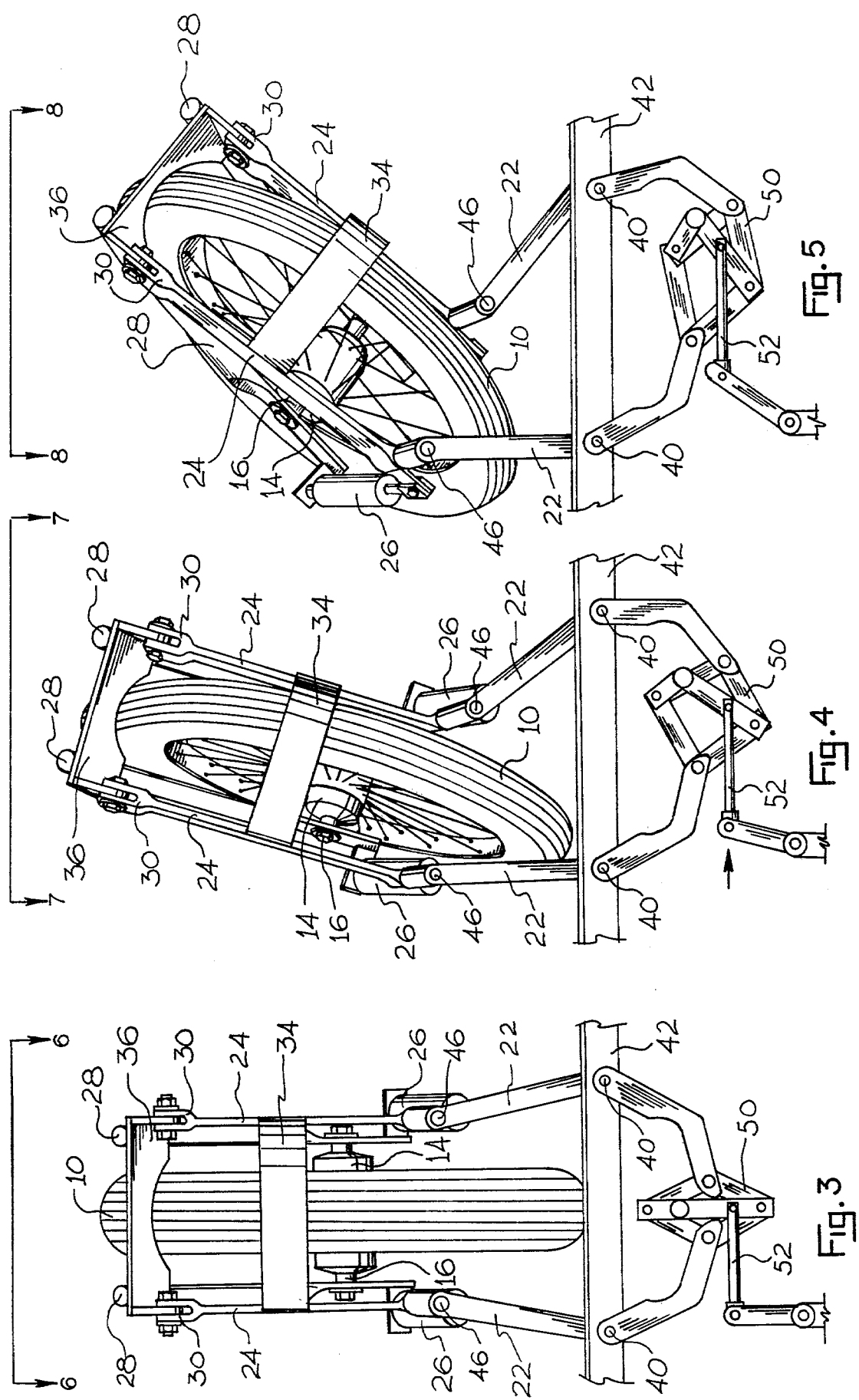

STEERING AND SUSPENSION SYSTEM FOR THE FRONT WHEEL OF A THREE-WHEELED VEHICLE

SUMMARY OF THE INVENTION

My invention relates to a steering and suspension device for the front wheel of a three-wheeled vehicle.

Heretofore, three wheeled vehicles have been considered unsafe because of their capacity for tipping upon taking a turn too sharply or at an excessive speed. This capacity has, to the present time, been due to the instability of the three-wheeled construction in which the third wheel is located on the longitudinal axis of the vehicle with the weight of the vehicle balanced along this axis.

When a three-wheeled vehicle enters a turn, centrifugal force produces the effect of shifting some of the vehicle's weight to the outside of the vehicle's longitudinal axis, causing the inside wheel of the vehicle to rise off the driving surface if the turn is sharp enough or the speed through the turn is great enough.

My steering and suspension system provides a solution to this problem by compensating for the effect of centrifugal force so as to keep the vehicle generally level through turns. This compensatory effect is produced by forcing the front wheel to move outwardly along the turn radius at its point of road contact and to simultaneously lean into the turn. The system includes suspension frames on either side of the wheel and steering arms connected to each suspension frame. Each suspension frame is generally triangular in shape and includes a shock absorbing member which absorbs vertical movement of the wheel. The steering arms are pivotally mounted on a frame member of the vehicle and spaced from each other. One end of each steering arm is pivotally associated with its connected suspension frame and the other end of each steering arm connects to a common linkage which causes the steering arms to rotate upon actuation of a steering apparatus. Pivoting of the steering arms moves the front wheel outwardly along the turn radius at its point of road contact and leans the wheel into the turn so that more of the vehicle's weight is located on the inside of the turn relative to the wheel, thus compensating for the effect of centrifugal force and maintaining the vehicle in a generally level relationship to the ground.

Accordingly, it is an object of this invention to provide a novel steering and suspension system for the front wheel of a three-wheeled vehicle.

Another object of this invention is to provide a steering and suspension system for the front wheel of a three-wheeled vehicle which minimizes tipping of the vehicle.

Still another object of this invention is to provide a steering and suspension system for the front wheel of a three-wheeled vehicle which compensates for the effect of centrifugal force in a turn by shifting the vehicle's weight toward the inside of the turn.

And yet another object of this invention is to provide a steering and suspension system for a three-wheeled vehicle which leans the wheel into a turn and simultaneously moves the point of road contact outwardly along the turn radius.

Other objects of this invention will become apparent upon a reading of the following description.

BRIEF DESCRIPTION OF THE DRAWINGS

FIG. 3 is a top view of the invention with the vehicle wheel shown in a straight position.

FIG. 4 is a top view of the invention with the vehicle wheel shown in a right turn position.

FIG. 5 is a top view of the invention with the vehicle wheel shown in a sharp right turn position.

DESCRIPTION OF THE PREFERRED EMBODIMENT

Figure 1:
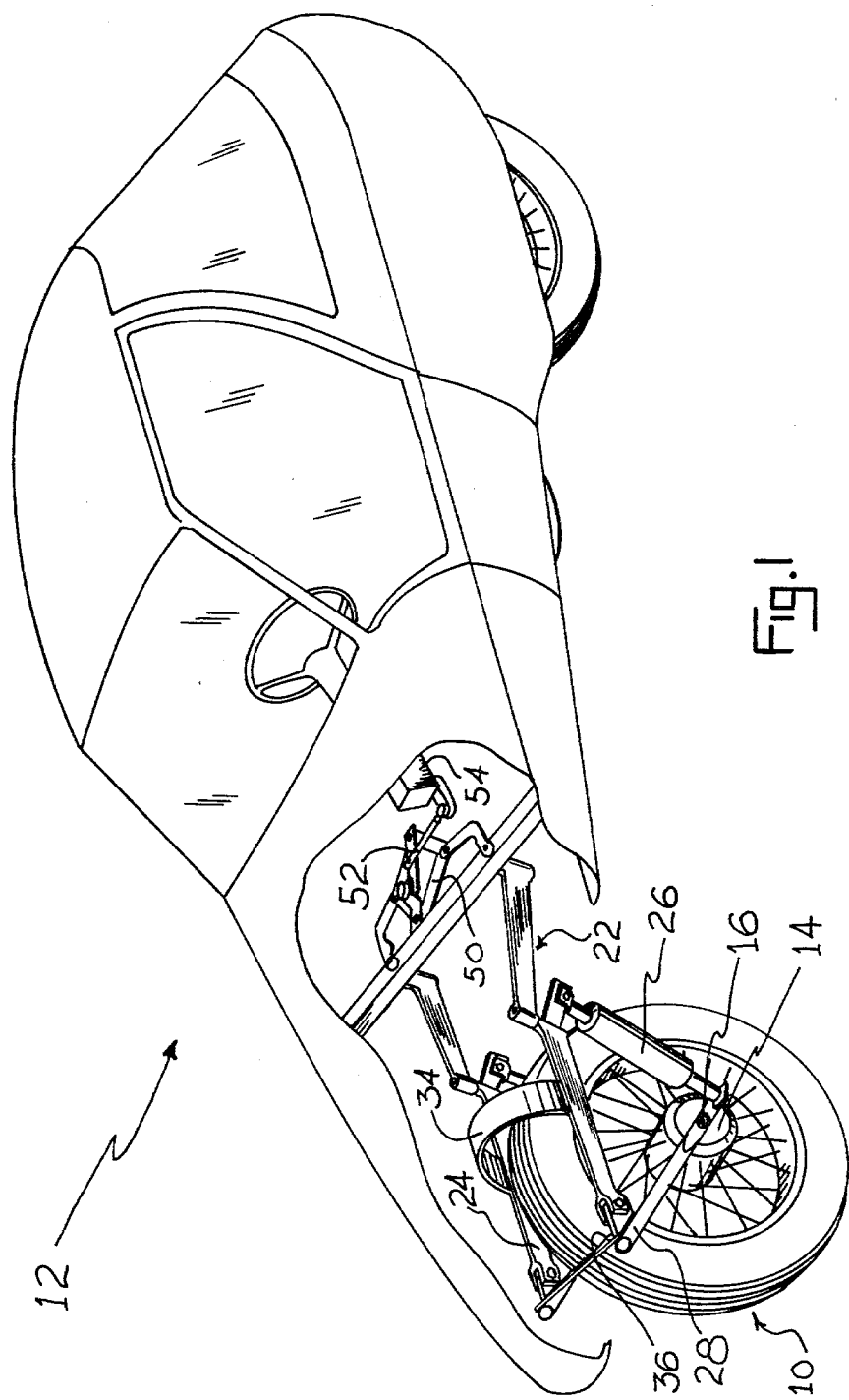
FIG. 1 is a perspective view of a three-wheeled vehicle with portions cut away in order to illustrate the invention.
Figure 2:
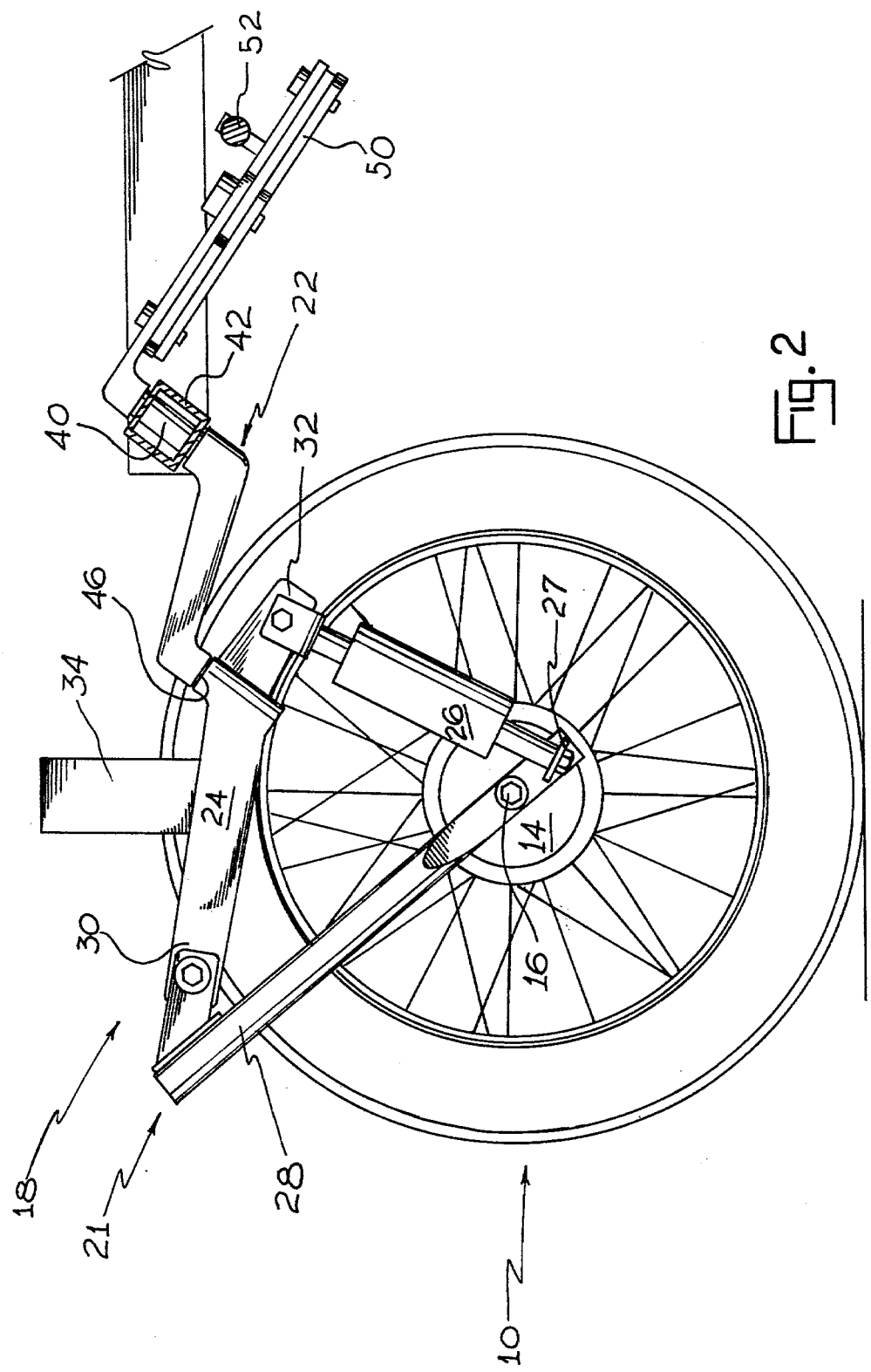
FIG. 2 is a side elevational view of the invention.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The invention is illustrated in FIGS. 1–8 and includes the front wheel 10 of a three wheeled vehicle 12. The front wheel has a central hub 14 having an axle 16. The steering and support device 18 of this invention includes a pair of suspension frames 21 and a pair of steering arms 22 pivotally connected to the suspension frames. Suspension frames 21 are located on each side of wheel 10 and are generally triangular in shape.

Each suspension frame 21 has a support arm 24, a shock absorber 26, and a support brace 28. Support arm 24 is positioned longitudinally above wheel axle 16 and has two ends 30, 32. Support brace 28 is pivotally connected at one end to support arm end 30. Support brace 28 extends downwardly and rearwardly from support arm end 30. Shock absorber 26 is pivotally connected at one end to support arm end 32. The opposite ends of support brace 28 and shock absorber 26 are pivotally joined at 27 to complete the triangular shaped suspension frame 21. Support brace 28 of each suspension frame 21 journals intermediate its ends one end of wheel axle 16. Suspension frames 21 are retained in a rigid spaced relationship at each side of wheel 10 by a cross brace 34 extending between support arms 24 and a cross brace 36 extending between support braces 28. Shock absorbers 26 cushion vertical movement of wheel 10 as support braces 28 pivot relative to support arms 24 at arm ends 30 during the wheel's vertical movement.

Figure 8:
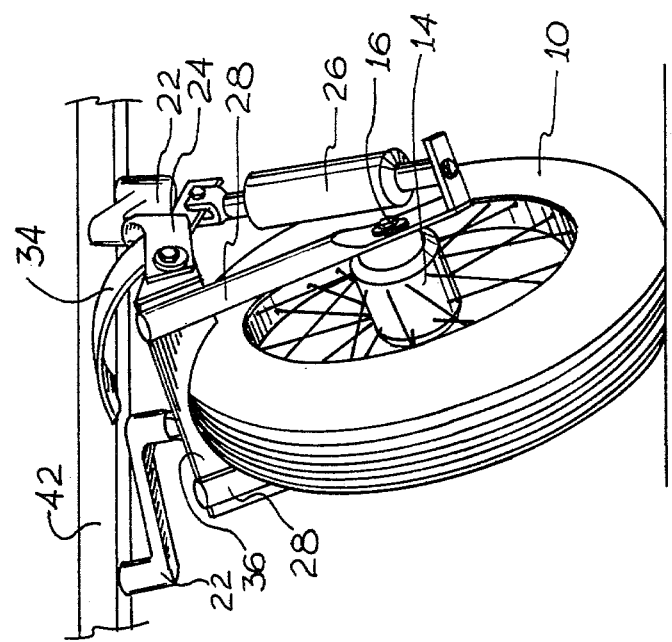
FIG. 8 is a front view of the invention as seen from line 8—8 in FIG. 5.
Figure 7:
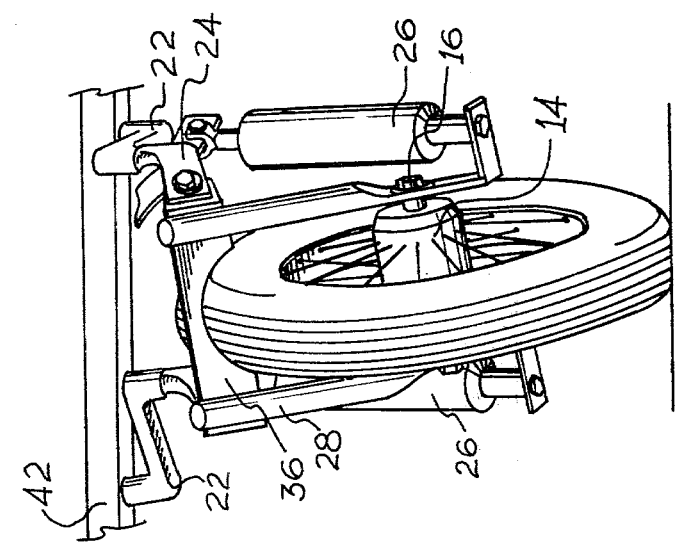
FIG. 7 is a front view of the invention as seen from line 7—7 in FIG. 4.
Figure 6:
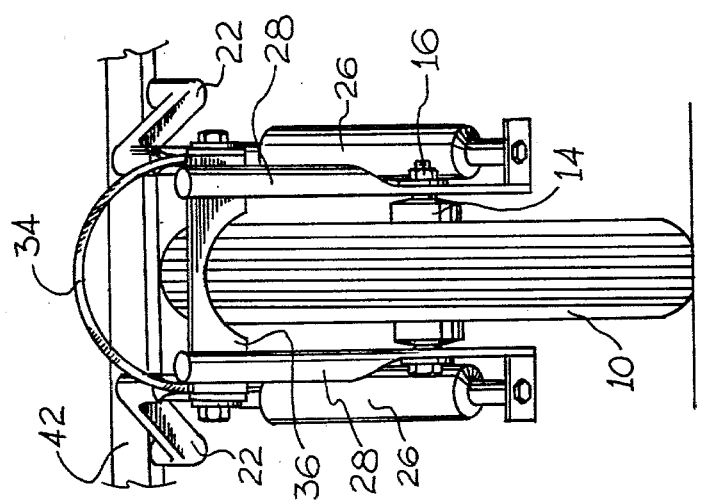
FIG. 6 is a front view of the invention as seen from line 6—6 in FIG. 3.

Each steering arm 22 is journaled at its pin-shaped end portion 40 in the vehicle's front cross-frame member 42. The opposite end of each steering arm 22 journals a pin 46 forming a part of the connected support arm 24 adjacent its end 32. Steering arms 22 angle upwardly from cross frame member 42 and pivot at end portions 40 about a tilted axis. Each steering arm 22 moves in an arcuate path varying in distance from and height relative to cross-frame member 42 as illustrated in FIGS. 6–8. Steering arms 22 also taper toward each other from cross-frame member 42 when wheel 10 is in a straight ahead position as illustrated in FIGS. 3 and 6. The pin-shaped end portions 40 of steering arms 22 are each connected to a linkage 50 which is actuated by the driver 52 of a steering apparatus 54.

Upon actuation of driver 52 in the direction illustrated in FIG. 4, linkage 50 unfolds causing one steering arm 22 to pivot inwardly in a direction opposite to the direction of desired turn of wheel 10 and the other steering arm 22 to pivot outwardly. As the one steering arm 22 pivots inwardly its end journaling pin 46 is lowered relative to the ground and frame member 42 while the similar end of the other steering arm 22 is raised relative to the ground and frame member 42 due to the angle of the steering arms. As wheel 10 is turned its point of road contact is moved outwardly relative to the center of the turn and the longitudinal axis of vehicle 12. Simultaneously, wheel 10 is leaned into the turn. Various positions of wheel 10, steering arms 22 and linkage 50 for right hand turns are illustrated in FIGS. 4, 5, 7, and 8. Corresponding wheel positions would occur for a left hand turn.

It is to be understood that the invention is not to be limited to the details above given, but may be modified within the scope of the appended claims.

What I claim is:

1. A steering and support device in combination with a wheel of a vehicle in which said wheel has a hub including a central axle, said vehicle including a frame, said steering and support device comprising: a pair of suspension frames carried by said axle, the first of said suspension frames spaced from and on an opposite side of said wheel from the second suspension frame, a lateral cross brace rigidly connected at one end to said first suspension frame and at its other end to said second suspension frame, a first steering arm pivotally connected at one end to said first suspension frame, and a second steering arm pivotally connected at one end to said second suspension frame, a first pin attached to said first steering arm and pivotally journalled in bearing means on said vehicle frame at a location spaced from said first steering arm one end, a second pin attached to said second steering arm spaced from said second steering arm one end and journalled in a second bearing means on said vehicle frame spaced from said first mentioned bearing means on said vehicle frame, linkage means for associating said first and second steering arms at their opposite ends to a steering control apparatus wherein said linkage means causes the steering arms to rotate about said first and second pins upon actuation of said steering control apparatus to turn said wheel in a chosen direction.

2. The steering and support device of claim 1 wherein said first and second steering arms angle upwardly from said vehicle frame member and taper toward each other when said wheel is in a straight forward position, said one end of each said first and second steering arm moving in an arcuate path varying in distance from, and height relative to, said vehicle frame.

3. The steering and support device of claim 1 wherein each said pin constitutes a portion of each said first and second steering arm and is rotatable about an axis extending at an angle with the vertical.

4. The steering and support device of claim 1 wherein each said first and second suspension frame includes a longitudinal support arm positioned above said axle and including first and second ends, each said first and second steering arm one end pivotally connected to a said support arm between said ends thereof, a support brace pivotally connected at one end to the first end of each support arm, shock absorbing means pivotally connected at one end to the opposite end of each support brace and at the other end to the second end of each support arm, each support brace connected intermediate its ends to said wheel axle, said shock absorbing means for cushioning vertical movement of said wheel as each support brace pivots relative to its connected support arm during said wheel vertical movement.

5. The steering and support device of claim 4 wherein said cross brace extends between the support arms of said suspension frames.

6. The steering and support device of claim 5 and a second cross brace extending between the support braces of said suspension frames.

7. The steering and support device of claim 4 wherein each said first and second steering arm is connected at its said other end to said linkage means, said linkage means for driving said steering arm other ends to rotate about said pins thereby forcing said wheel to simultaneously move outwardly along the turn radius at its point of road contact and to lean toward the direction of turn upon actuation of said steering apparatus.

* * * * *